J. CROWTHER.
FLOWER POTS.

No. 195,094. Patented Sept. 11, 1877.

Witnesses:

Inventor:
Joshua Crowther

UNITED STATES PATENT OFFICE.

JOSHUA CROWTHER, OF CHICAGO, ILLINOIS.

IMPROVEMENT IN FLOWER-POTS.

Specification forming part of Letters Patent No. 195,094, dated September 11, 1877; application filed October 19, 1876.

*To all whom it may concern:*

Be it known that I, JOSHUA CROWTHER, of the city of Chicago, Cook county, State of Illinois, have invented a new and useful Improvement in Flower-Pots, of which the following is a full description, reference being had to the accompanying drawings, in which—

Figure 1:
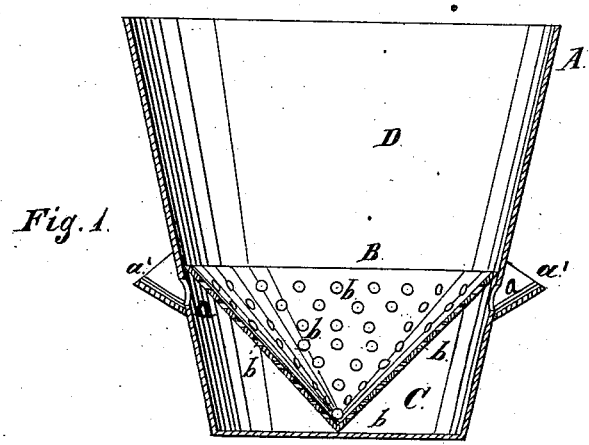
Figure 2:
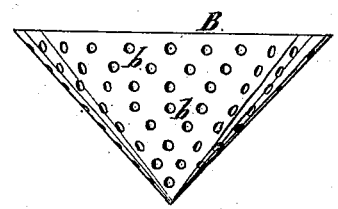

Figure 1 is a vertical section of a flower-pot, with the diaphragm in place; Fig. 2, an elevation of the diaphragm removed.

The object of this invention is to so construct a flower-pot that both air and water can circulate freely about the roots of plants, and the capillary attraction of the soil equalize the distribution of the water; and its nature consists in providing the flower-pot with a conical-shaped diaphragm or false bottom, having holes in the inclined sides located in different horizontal planes, so as to utilize the capillary powers of the contained earth nearly or quite down to the bottom of the water-compartment, and to admit air through the upper holes thereof before the water ceases its contact; and in the combination of such inverted conical diaphragm or false bottom with the outer vessel or pot, so as to leave a water-space around such cone.

In the drawings, A represents the pot, which is to be made of any suitable material, and in any desired form. The bottom of this pot A is solid or water-tight, and holes $a$ are provided in its side, through which water can be introduced.

B is the diaphragm or false bottom, which is made of any suitable material, and is of a conical or pyramidal shape inverted. Through the sides of this diaphragm are a number of small holes, $b$. The diaphragm should be of such size that when it is in position its upper edge will be a little above the holes $a$, with its apex resting on the bottom of the pot.

C is a space between the sides of the diaphragm B and the walls of the pot, formed by placing the diaphragm in position.

D is the space above the diaphragm, in which the soil and plant are placed, as usual.

In use, water is introduced into the space C through the holes $a$, and is drawn through the holes $b$ into the earth above the diaphragm and around the roots of the plants. Air will also enter through the holes $a$, and will pass up through the holes $b$ and around the roots of the plant, thus feeding the roots both with air and water, which is desirable.

The advantages of this mode of constructing a flower-pot are: The air and water can circulate freely about the roots of the plant; the dirt will not become packed around the roots; it does away with the use of a saucer; there is no hole in its bottom for the escape of the dirt; and it can be used anywhere without the danger attending the use of common flower-pots by reason of an overflow of water, or from the scattering of small particles of dirt, which work their way into the saucer through the holes in the bottom of the pot.

If desired, the apex of the cone B may be flattened, so as to form a base for it to rest on the bottom of the pot.

The handles $a'$ are applied to the pots so as to act as funnels for, and at the same time partly to obscure, the holes $a$.

I do not claim, broadly, a perforated diaphragm or false bottom, having a water-space beneath it, in a flower-pot; but

What I claim as new, and desire to secure by Letters Patent, is as follows:

1. The conical or pyramidal diaphragm or false bottom B, having its inverted apex extended into the water-space for distributing the water, substantially as set forth.

2. The conical-shaped diaphragm or false bottom B provided with holes $b$, in combination with the pot A having one or more holes, $a$, substantially as and for the purposes specified.

JOSHUA CROWTHER.

Witnesses:
O. W. BOND,
F. F. BRUNS.